United States Patent [19]
Bailey

[11] Patent Number: 5,948,214
[45] Date of Patent: Sep. 7, 1999

[54] ISOTOPE SEPARATION

[75] Inventor: Geoffrey H Bailey, Preston, United Kingdom

[73] Assignee: British Nuclear Fuels, plc, Cheshire, United Kingdom

[21] Appl. No.: 08/875,269

[22] PCT Filed: Jan. 26, 1996

[86] PCT No.: PCT/GB96/00168

§ 371 Date: Jul. 22, 1997

§ 102(e) Date: Jul. 22, 1997

[87] PCT Pub. No.: WO96/23578

PCT Pub. Date: Aug. 8, 1996

[30] Foreign Application Priority Data

Feb. 3, 1995 [GB] United Kingdom .................. 9502169

[51] Int. Cl.$^6$ ....................................................... B01D 5/00
[52] U.S. Cl. .............................. 204/157.21; 204/157.2; 204/157.22; 250/281
[58] Field of Search ........................ 204/157.2, 157.21, 204/157.22; 250/423 P, 281

[56] References Cited

U.S. PATENT DOCUMENTS 5,110,562  5/1992  Sasao et al. ........................... 422/186

FOREIGN PATENT DOCUMENTS

A1-0 073 716  3/1983  European Pat. Off. .
2-86814  3/1990  Japan .

OTHER PUBLICATIONS

J. Applied Physics B (Springer–Verlag), 46, pp. 253 to 260 (1988), J.A. Paisner. No month available.

Primary Examiner—Arun S. Phasge
Assistant Examiner—Edna Wong
Attorney, Agent, or Firm—Oliff & Berridge, PLC

[57] ABSTRACT

A method of isotope separation includes vaporisation and atomising in an evacuated chamber a supply of the element whose isotopes are to be separated to form a stream of atoms of the element in the chamber. The supply which is vaporized includes an involitile compound of the element which is decomposed in the vaporisation process to provide the stream of atoms.

12 Claims, 1 Drawing Sheet

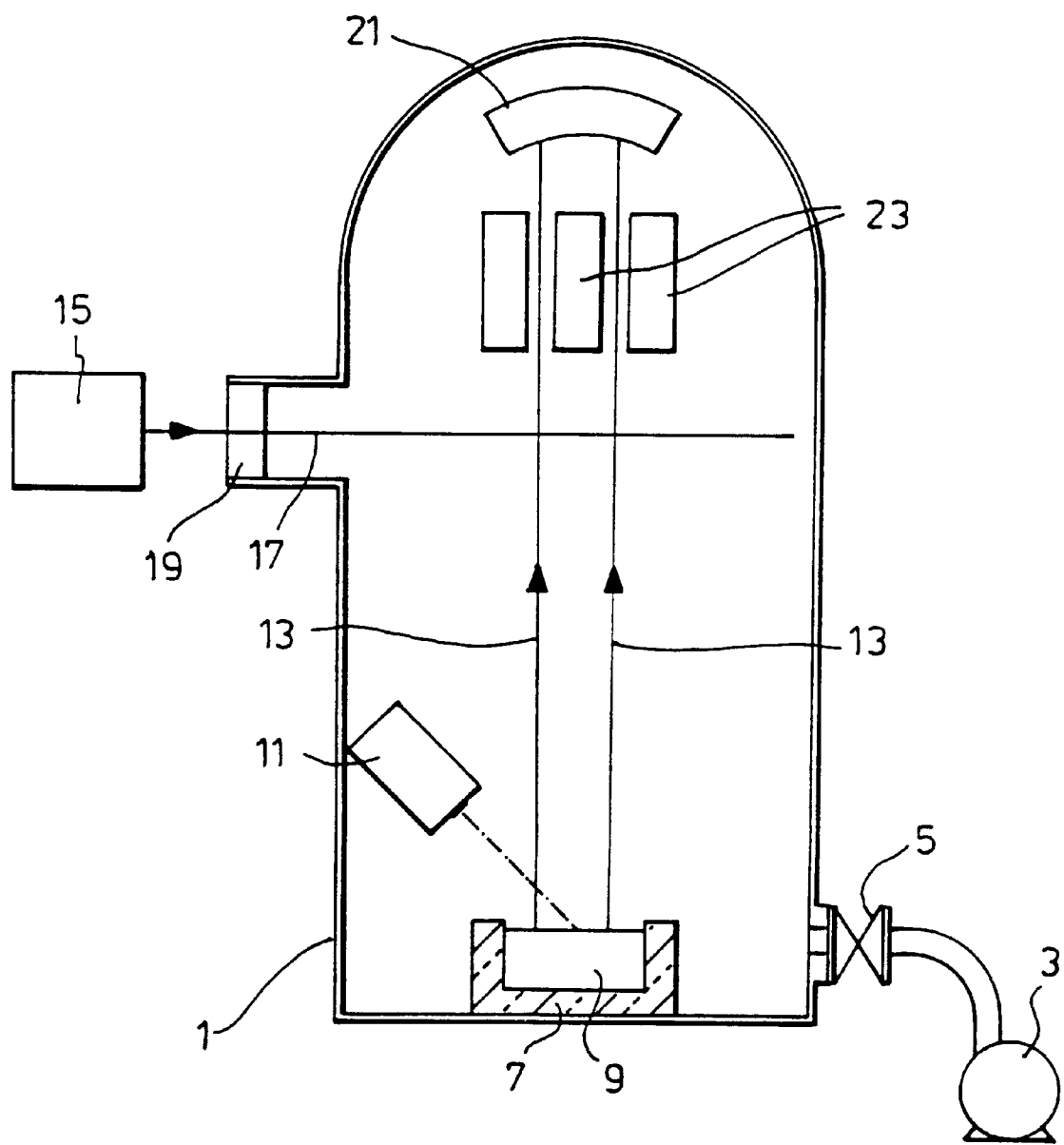

ISOTOPE SEPARATION

This is a national stage application of PCT/GB96/00168 filed Jan. 26, 1996.

BACKGROUND OF THE INVENTION

1. Field of the Invention

The present invention relates to the separation of isotopes, particularly to producing an atomic vapour from which the isotopes are separated.

2. Description of the Related Art

The process known as atomic vapour laser isotope separation (AVLIS) has been widely reported. It is described for example in J Applied Physics B (Springer-Verlag) 46, pages 253 to 260 (1988). An atomic vapour stream comprising different constituent isotopes is formed in an evacuated chamber and is irradiated by electromagnetic radiation, e.g. laser radiation, which causes at a selected frequency photoionisation of one of the constituent isotopes allowing that isotope to be separated by an electric or magnetic field.

BRIEF SUMMARY OF THE INVENTION

According to the present invention there is provided a method of isotope separation which comprises vaporising and atomising in an evacuated chamber a supply of the element whose isotopes are to be separated to form a stream of atoms of the said element in the chamber, and characterised in that the said supply which is vaporised comprises an involatile compound of the said element which is decomposed in the vaporisation process to provide the said stream of atoms.

Where the said element is combined in the said compound with one or more other elements which when liberated by decomposition can cause deleterious or harmful effects, e.g. partially destroy the vacuum or corrode parts of the chamber or recombine with the said element, a source of one or more further elements may advantageously be employed in the supply of material to be vaporised to react with the liberated element(s) to form one or more further involatile compounds. For example, where the liberated element is a non-metallic gas or vapour such as oxygen or sulphur or a halogen, the said further element may comprise a metallic element such as iron which readily forms an appropriate involatile iron oxide or sulphide or halide as appropriate.

The present invention is to be distinguished from molecular vapour laser isotope separation known in the prior art in which a molecular stream, e.g. of uranium hexafluoride, is irradiated with laser radiation to provide photoionisation to facilitate isotope separation. The compound per se is necessarily volatile and is not decomposed until it is treated by the laser radiation. In contrast, by decomposing in the vaporisation step (usually in a crucible or hearth) an involatile compound containing the element comprising the isotopes to be separated, the cost of operating an enrichment process such as the AVLIS process, for example, can be beneficially be reduced since the involatile compound can be an inexpensive (or less expensive) source of the said element. For example, many heavy metal or rare earth metals exist more cheaply in the form of an oxide than in elemental form.

The element whose isotopes are to be separated by the method of the present invention may be selected for example from Ca, Zn, Sr, Cd, Ba, Hg, C, Si, Ge, Sn, Pb, or lanthanides or actinides especially Er, Ce, Yb, Sm, Gd, U or Pu.

The present invention is particularly beneficial to the isotopic separation of gadolinium. This element is used as an additive in nuclear fuel materials to form a burnable poison which deliberately reduces fuel efficiency thereby allowing greater fuel enrichment levels to be employed without loss of control of overall activity. Only certain isotopes, viz Gd 155 and Gd 157, provide the desired poison effect and it would be beneficial to have an economical process for the separation of these isotopes from unreactive isotopes of Gd. Whilst Gd metal is very expensive owing to the high cost of conversion from its source material gadolinia, the gadolinia itself provides a suitable and inexpensive supply material to separate gadolinium isotopes by use in the present invention. Cost reduction benefits are similarly offered by the separation of isotopes of other elements using starting materials comprising compounds of the element in question, e.g. urania for uranium isotope separation.

In the method of the present invention the evacuated chamber may be a known chamber evacuated by a pump in a conventional manner to a pressure preferably less than $10^{-6}$ torr. The vaporisation and atomisation may be carried out by depositing a charge or supply of the element containing material to be vaporised in a crucible or hearth, e.g. made of a high melting ceramic such as tungsten carbide heated in a known way (depending upon the temperature to be attained) e.g. using electron beam, resistive, or inductive heating. The method may be carried out in such a way that the crucible is continuously supplied with a fresh feed of the said charge.

Ionisation of the element atomic vapour stream is required and, for example, may be accomplished by passing a beam of electromagnetic radiation which may comprise one or more laser beams generated in a known way to have a frequency tuned to produce the required selective photoionisation transition or transitions. The manner in which the radiation is generated and applied, given the photoionisation transition(s) to be achieved, will be readily apparent to those skilled in the art and these known steps are not material to the scope of the present invention. For example, the laser radiation may be produced by one or more high energy lasers, e.g. excimer, gas vapour or solid state lasers, employed to pump one or more tunable dye lasers as in the prior art to give the required photo-transition. The phototransition may for example be achieved by photo-excitation in two or more stages. For example three laser beams of selected frequencies may be employed in the manner described below. As is known in the prior art the laser beams may have selected polarisations to provide the selected atomic transitions. Techniques such as laser frequency doubling, tripling or halving may be employed to achieve the required frequencies. The laser beams may be pulsed.

The ions produced by the laser beam in the method of the present invention may be separated in a known way by provision of collector plates held at a suitable negative electric potential, suitable to provide the required deflection. The ions could alternatively be separated in a known way by deflection using a magnetic field. In either case, the neutral atoms will be unaffected by the applied field and may continue to a collector means where they are collected. The neutral atoms collected will also include those of any other element or elements present, e.g. oxygen, liberated by vaporisation in the crucible, from the compound containing the element to be separated together with another element, e.g. iron, provided to react with the oxygen, for example. The collector means may be cooled to facilitate condensation and collection.

BRIEF DESCRIPTION OF THE DRAWING

An embodiment of the present invention will now be described by way of example only with reference to the accompanying drawing, in which is shown a side elevation in schematic form of an apparatus arrangement for carrying out a method embodying the present invention.

DETAILED DESCRIPTION OF THE INVENTION

As shown in the drawing, a vacuum chamber 1 is evacuated by a pump 3 via a valve 5. A crucible 7 is held inside the chamber 1. A charge 9 of material in the crucible 7 is vaporised by an electron beam heater 11. This causes a stream 13 of atoms having isotopes to be separated to travel upward through the interior of the chamber 1.

A laser system 15 generates laser radiation 17 which is passed into the chamber 1 through a window 19. The radiation 17 passes through and interacts with the stream 13. The frequency or frequencies of the radiation 17 is selected so that it brings about photoionisation of one or more selected isotopes in the stream 13. Collector plates 23 are held at a negative potential to provide a suitable deflection of the ions produced by the photoionisation process. These ions are deflected toward the collector plates 23 where they are collected in a known way. Neutral atoms in the stream 13 unaffected by the radiation 17 continue to a collector 21 where they are collected in a known way. The neutral atoms include atoms of oxygen and iron which eventually are collected at the collector 21. The material which collects on the collector 21 will be a mixture of (i) unwanted (mainly) isotopes of the element being separated, (ii) oxide(s) of those isotopes of that element, (iii) iron oxide(s), and (iv) iron.

As noted above, the atoms of the stream 13 may comprise isotopes of gadolinium. The charge 9 may comprise gadolinia mixed intimately with iron. The proportion of iron required will be in excess of the chemical equivalent of the gadolinium to be collected as metal on the plates 23. The temperature of the charge 9 produced by the heat from the electron beam heater 11 may be several thousand degrees Kelvin thereby causing vaporisation and atomisation of the gadolinium and of the residual oxygen and iron.

Alternatively, decomposition of the gadolinia and atomisation of the gadolinium, oxygen, and iron may be achieved by means of injection through a plasma system. An arc plasma or radio frequency plasma would be favoured.

Iron oxide is collected at the collector 21 and may subsequently be removed after completion of the process and separation from gadolinium in the material collected by the collector 21.

Desirably the laser radiation 17 is selected to ring about photoionisation of Gd 155 and/or Gd 157. The electronic transitions involved in this photoionisation process and the requirements of the radiation 17 to bring about such photoionisation are known per se. For example, Table 1 as follows lists the energy levels of electronic ground and transition states available in odd Gd isotopes. The symbol J in Table 1 represents the various sub-level states known to be available in the various Levels polarisation selection rules.

TABLE 1

| Level 1 | | Level 2 | |
|---|---|---|---|
| Energy (cm$^{-1}$) | J | Energy (cm$^{-1}$) | J |
| 0 | 2 | 16923.38 | 2 |
| 215.12 | 3 | 17227.96 | 1 |
| | | 17380.83 | 2 |

TABLE 1-continued

| | | 17749.97 | 2 |
|---|---|---|---|
| Level 3 | | Level 4 - Autoionizing | |
| Energy (cm$^{-1}$) | J | Energy (cm$^{-1}$) | J |
| 32660.84 | 1 | 49799.29 | 0 |
| 34586.73 | 1 | 50624.69 | 0 |
| 35254.58 | 1 | | |

Ionisation may be achieved by providing three beams of comprising: (a) a first beam of laser radiation having a frequency equal to the transition from a selected sub-state of Level 1 to a selected sub-state of Level 2; (b) a second beam laser radiation having a frequency equal to the selected sub-state of Level 2 to a selected sub-state of Level 3; and (c) a third beam of laser radiation having a frequency selected to bring about the transition from a sub-state of Level 3 to a sub-state of Level 4. The laser beams, especially to bring about the first two transitions, may be tuned in frequency. All of the laser beams may be produced for example by tunable dye lasers pumped by a single copper vapour laser. The laser beams may be pulsed the pulses being longer than the lifetime of the populations they are to excite. The pulses of the respective beams may also be temporally delayed so that the required transitions follow in sequence. A preferred transition route is to employ the 215.12 cm$^{-1}$ sub-state at Level 1 and the 34586.73 cm$^{-1}$ sub-state at Level 3.

I claim:

1. A method of separating isotopes of an element which comprises a process of vaporisation and atomising in an evacuated chamber a supply of a material containing the element whose isotopes are to be separated to form a stream of atoms of said element in the chamber, wherein said supply which is vaporised comprises an involatile compound of said element, the involatile compound being decomposed in the vaporisation process to provide said stream of atoms of said element.

2. The method of claim 1, wherein said involatile compound comprises a first one or more further elements combined with the element whose isotopes are to be separated, said first one or more further elements when liberated by said vaporisation process comprise a non-metallic gas or vapour, said supply of material further includes a source of a second one or more further elements to be vaporised and to react with the liberated first one or more further elements to form a second involatile compound.

3. The method of claim 2, wherein the first one or more further elements combined with the element whose isotopes are to be separated and which is liberated by the vaporisation process comprises one or more of oxygen, sulphur and halogen and said second one or more further elements comprises a metallic element which forms an oxide, sulphide or halide with the liberated first one or more further elements to form said second involatile compound.

4. The method of claim 3, wherein the metallic element comprises iron.

5. The method of claim 1, wherein the element whose isotopes are to be separated is selected from the group consisting of: Ca, Zn, Sr, Cd, Ba, Hg, C, Si, Ge, Sn, Pb, Er, Ce, Yb, Sm, Gd, U and Pu.

6. The method of claim 5, wherein the element whose isotopes are to be separated is Gd and the isotope to be selected is Gd 155.

7. The method of claim 5, wherein the element whose isotopes are to be separated is Gd and the isotope to be selected is Gd 157.

8. The method of claim 7, wherein the ionised isotopes are deflected by an electric field.

9. The method of claim 7, wherein the electromagnetic radiation comprises laser radiation.

10. The method of claim 7, wherein the ionised isotopies are deflected by a magnetic field.

11. The method of claim 1, wherein the stream of atoms is subjected to electromagnetic radiation having a frequency which selectively ionises an isotope of said element.

12. The method of claim 1, wherein the electromagnetic radiation comprises laser radiation.

* * * * *